March 22, 1955 S. GABRIELSON ET AL 2,704,457
GYRO SETTING ARRANGEMENT
Filed Oct. 16, 1953 2 Sheets-Sheet 1

Inventors:
Samuel Gabrielson,
Hans A. Bakke,
by Richard E. Horley
Their Attorney.

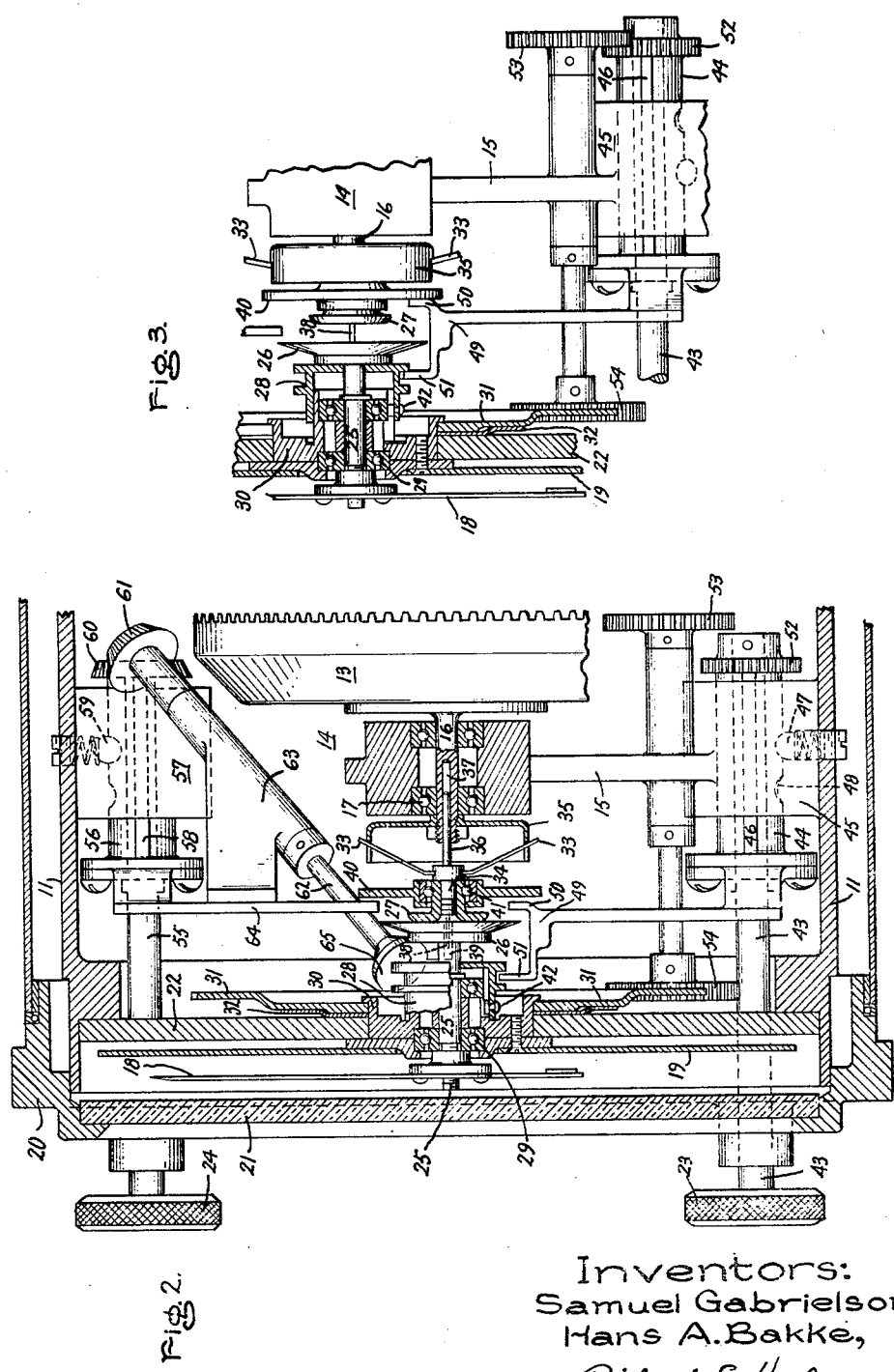

United States Patent Office 2,704,457
Patented Mar. 22, 1955

2,704,457

GYRO SETTING ARRANGEMENT

Samuel Gabrielson, South Lynnfield, and Hans A. Bakke, Swampscott, Mass., assignors to General Electric Company, a corporation of New York Application October 16, 1953, Serial No. 386,488

12 Claims. (Cl. 74—5.6)

The present invention relates to gyroscopes and, more particularly, to improved setting and adjusting mechanisms for directional gyroscope indicating apparatus.

Universally-mounted gyroscopes for maintaining azimuth references aboard aircraft are commonly provided with a gear attached to the main gimbal, which gimbal is held fixed in azimuth by the spatial rigidity of the gyro rotor, and a cup-shaped gear rotatably supported by the outer casing and meshing with the gimbal gear to be rotated thereby and, in turn, to rotate a dial or pointer whenever the supporting aircraft turns in azimuth relative to the axis of spin of the gyro rotor. Each time the instrument is put into operation, the spin axis and pointer must be properly set in azimuth, and, later, resetting may be required to compensate for gyro drift effects. In the class of instruments which have an azimuth pointer cooperating with a relatively stationary dial plate, provision is often made for the angular adjustment of both pointer and dial so that a desired azimuth or course reading always brings the pointer to some preferred position, such as vertical, which may be readily scanned by the observer to ascertain at a glance whether or not the craft is on course.

Because universally-mounted gyroscopes react to even the slightest torques about the two gimbal support axes, thereby causing an erroneous precession of the rotor structure from its proper attitude in space, it is essential that the apparatus employed to set or adjust the pointers or dials reflect no torques upon the gyroscope mechanisms. Further, the adjustable indicating apparatus must be capable of translating the most minute mechanical gyro signals into azimuth indications which are precise and accurate, this requirement dictating that the indicating apparatus be rugged and yet exact in operation. It has been customary in the past to provide a caging mechanism which physically restrains movements of the directional gyro about the minor or horizontal axis of freedom and to urge the main gimbal and its permanently attached indicating apparatus to a desired angular heading by a manually-operated apparatus while the gyro is caged. Relative movements of the indicators and gyro mechanism have also been permitted by slip-friction connections therebetween, giving further flexibility in the matter of indicator adjustments. However, these setting and adjusting arrangements introduce pronounced disadvantages, such as: the severe loading of bearings while caging is being accomplished; the imposition of highly undesirable precessing torques while the caging is released; and the necessity for uncaging only while the supporting craft is not maneuvering away from a substantially level flight attitude. Modern rigorous demands for instrument accuracy and simplicity of adjustment are unsatisfied by gyro instruments having such conventional indicating mechanisms.

Accordingly, the arrangement here disclosed avoids the foregoing disadvantages and yields further beneficial characteristics by a unique adjustable indicator arrangement which may be completely decoupled from a directional gyroscope when settings or adjustments are made and which permits the gyroscope mechanism to remain uncaged and function as a gyroscope at all times. In one embodiment, provision is made for a control by two manually-actuable knobs, one of which may be operated to disengage the indicating mechanism from the gyro and rotate a pointer alone, and the other of which may be operated to disengage the indicating mechanism from the gyro, couple the pointer with a cooperating dial, and rotate both the pointer and dial simultaneously. Magnetic clutching apparatus is employed to engage and disengage the indicating and gyro mechanisms, with no backlash or reflection of torques therebetween, and a portion of the same clutching apparatus also couples and decouples the pointer and dial without backlash or torque effects. As appears more fully hereinafter, gyro front-end or adjustable indicating mechanisms in accordance with this invention are further distinguished by anti-backlash couplings between the gyro and magnetic clutching apparatus and between the pointer and pointer-setting knob, and the reflected torques which can be developed are suppressed to such small magnitudes that gyro precession errors are minimized.

One of the objects of the present invention is to provide a novel and improved directional gyroscope having adjustable direct-indicating mechanisms.

A second object is to provide a high-precision gyroscope having improved apparatus for setting and adjusting the output signals thereof.

Another object is to provide improved indicating arrangements for directional gyroscopes which do not disturb gyro operation during setting and adjusting processes.

Still further, it is an object to provide improved directional gyroscopes having independently adjustable indicators with anti-backlash couplings and magnetic clutching elements for preventing reflection of torques which might cause precession.

By way of a summary account of one aspect of this invention, the detecting apparatus comprises a three-degree-of-freedom directional gyro assembly, including a rotor structure pivotally supported about minor and major axes, and gearing which angularly orients an output shaft to characterize the azimuth heading of the supporting craft in relation to the azimuth position of the gyro rotor spin axis. In association with the detecting apparatus is an independently adjustable mechanism for coupling the gyro output shaft with an azimuth pointer which is read against a dial bearing azimuth indicia. A first magnetized clutch element is affixed to the pointer shaft, and a second clutch element, made of magnetic material, is angularly fixed in relation to the gyro output shaft but is axially movable and resiliently urged axially into a magnetic holding engagement with the pointer shaft clutch member, such that the pointer may rotate with the gyro output shaft. A knob is provided for manual actuation of a member which axially disengages the clutch elements, and for manual rotation of the pointer to a desired heading when it is declutched from the gyro. A third clutch element, of magnetic material, is angularly fixed and axially slidable in relation to the dial, whereby a second knob may be manually actuated to declutch the gyro shaft from the pointer shaft, engage the first and third clutch elements, and rotate the pointer and dial simultaneously and independently of the gyroscope mechanism.

Although the features of this invention which are believed to be novel are set forth in the appended claims, the details of preferred embodiments and further objects and advantages may be most readily comprehended by reference to the following description taken in connection with the accompanying drawings, wherein:

Fig. 2 illustrates a partly sectionalized top view of the indicator assembly for the instrument of Fig. 1; and Fig. 3 represents a partly sectionalized side view of a portion of the indicator assembly of the same instrument.

Figure 1:
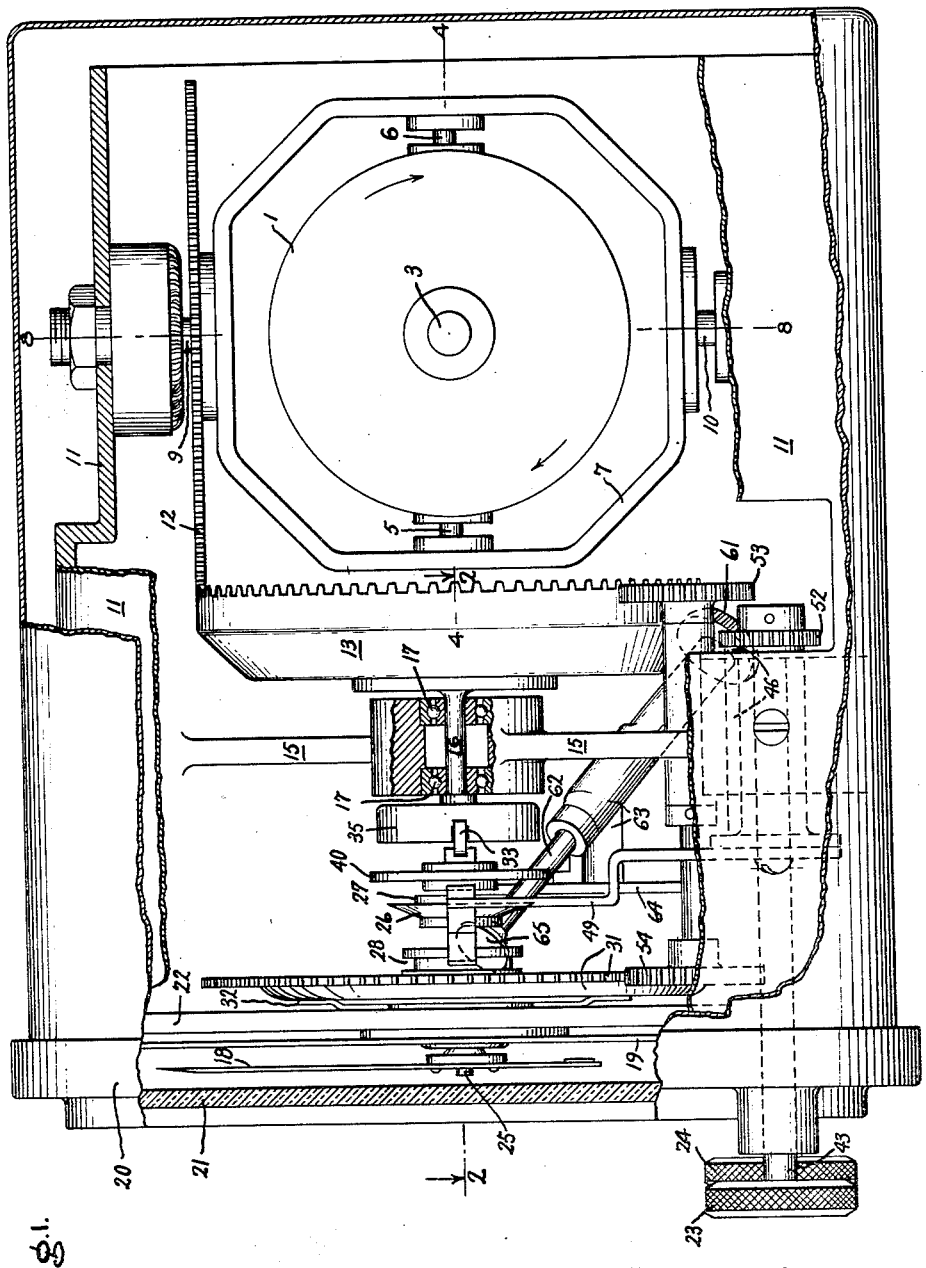
Fig. 1 is a pictorial side view of a directional gyroscope constructed in conformity with this invention, the casing structure being broken away to reveal portions of the gyro and indicator assemblies.

That arrangement for practicing this invention which is illustrated in Fig. 1 includes a directional gyroscope unit having a gyro rotor member 1 which is spun at high speed about a normally horizontal spin axis 3. The rotor structure, including electrical rotor motive means (not shown), is pivotally supported about a horizontal minor axis 4—4 by journals 5 and 6 in gimbal 7, and vertical gimbal 7 is pivotally supported about a vertical major axis 8—8 by journals 9 and 10 in the instrument frame 11. Although the rotor structure shown is that disclosed in the copending application of H. C. Wendt, Serial No. 325,577, filed December 12, 1952, for "Symmetrical Gyroscope," assigned to the same assignee as that of the present application, other and conventional structure may be employed instead. The usual gimbal gear 12 is attached to gimbal 7 and is in a driving meshed relationship with a conventional unity ratio cup-gear 13 which is revolubly supported by bearings in a hub 14 fixed with frame 11 by spacers 15. Cup-gear shaft 16 thus rotates in hub bearings 17 by angular amounts equal to the angular movements of the outer frame 11 in relation to the gimbal 7, which gimbal is rigidly preserved in a set azimuth orientation by the gyroscopic inertia of rotor 1.

The front-end or adjustable indicating mechanism of the instrument translates the angular orientations of the gyro output shaft 16 into angular orientations of an azimuth pointer 18 which is read against azimuth indicia appearing on a dial 19. Front flange 20 supports both a glass window 21, through which the dial and pointer may be viewed, and a front bracket 22 which provides bearing support for the angularly movable pointer and adjustable dial. Each of the manually actuatable knobs 23 and 24 projects forward from the front flange 20 and is adapted for both axial and angular movement to accomplish the desired decoupling and adjusting operations.

The adjusting operation performed by knob 23 is that of rotating both the pointer 18 and dial 19 simultaneously, such that the azimuth index representing the course being flown will be at a preferred position as seen by the observer. As is explained hereinafter, this adjustment cannot be effectuated until knob 23 has been pushed inward axially, and that axial movement completely severs the coupling between the gyro and indicators and thus makes it impossible for the dial and pointer adjustment movements to reflect erroneous precessing torques upon the gyroscope. Knob 24 may also be rotated to accomplish angular setting or adjustment of pointer 18 alone, and such pointer movement may likewise be accomplished only after knob 24 has been pushed inward axially and has caused decoupling of the pointer from the gyro.

Because the indicator mechanism is comprised of some elements which are in a nested relationship and others which are not wholly visible in one elevation, reference should be made to the top view of the mechanism as it appears in Fig. 2, as well as to the side view in Fig. 1, in connection with the following description. Corresponding elements bear the same identifying characters in both views. It should first be noted that the pointer shaft 25, which is rigidly affixed to pointer 18, is fastened to a permanently magnetized disk member 26 at its rearmost end. This magnetized disk member serves as a dual clutch element, in that its rear surface may be engaged in a holding relationship with the magnetic gyro clutch member 27 and in that its front surface may be engaged in a holding relationship with the magnetic dial clutch member 28. Pointer shaft 25 is rotatably mounted in the instrument by means of ball bearings 29 which are set in a bushing 30, that bushing being fitted in the front bracket 22. Dial plate 19 and setting gear 31 are affixed to bushing 30 on opposite sides of front bracket 22, and a spring member 32 intermediate the setting gear 31 and bracket 22 restrains angular movement of the dial, bushing and setting gear in relation to the front bracket. Normally, the dial and setting gear unit are held stationary by the spring member 32, although the pointer is rotatable concentrically therewith in bearings 29. When megnetized clutch element 26 is engaged with gyro clutch member 27, the pointer 18 moves angularly with the gyro output shaft 16, and thereby indicates the azimuth orientation of the supporting craft. This condition is represented in Figs. 1 and 2, and it will be observed that magnetic clutch member 27 is angularly coupled with gyro output shaft 16 through a two-sided flat wire spring 33 which is attached to the clutch member shaft 34 and which extends through narrow transverse slots in a cup-shaped coupler 35 affixed to output shaft 16. A shaft extension 36 projects from shaft 34 into a recess 37 in gyro output shaft 16 to permit axial sliding movement therebetween while preserving axial alignment of these shafts and pointer shaft 25 as well. Guide extension 38 projects forward from shaft 34 into a larger recess 39 in the pointer shaft 25 to insure that the shafts do not become misaligned when clutch decoupling has been accomplished. However, the guide extension 38 preferably remains out of firm contact with the recess surfaces so that there is no appreciable friction therebetween when the clutch member 27 is disengaged from the magnetized clutch element 26. Clutch decoupling is facilitated by a clutch throw-out plate 40 which is mounted about the gyro clutch member 27 on bearings 41. When this throw-out plate is pressed rearwardly it pulls the magnetic clutch member 27 out of engagement with magnetized clutch element 26 and causes it to slide axially against the restraining force of wire springs 33. At such times the springs 33 flex upwardly through the slots in cup member 35, and the shaft extension 36 slides further into recess 37 while preserving alignment between all the shafts. Bearings 41 permit the gyro output shaft to rotate with reference to throw-out plate 40 and frictions reflected upon the gyroscope from bearings 41 as so minute as to leave the gyroscope operating unhampered during declutching intervals. Pointer 18 or both the pointer and dial 19 may be angularly adjusted whenever such declutching is realized without affecting the gyroscope mechanism.

Clutch element 26 and gyro clutching member 27 adhere firmly when brought into contact and it is a distinct advantage that there is no angular backlash which is experienced between these magnetically-coupled members. The mating surfaces of element 26 and member 27 may be roughened somefhat, as by sandblasting, to further insure against angular slippage between them. An additional anti-backlash provision is that of the axially-resilient and angularly-rigid coupling between flat wire springs 33 and cup member 35. Transverse slots in the cup member 35 are of substantially the same width as the springs 33 which slide through them, and the springs and cup member are always engaged so that relative angular movements are precluded.

A second magnetic clutching arrangement is that which couples the dial 19 with the pointer 18. For this coupling the front surface of magnetized element 26 is engaged with the rear surface of the magnetic dial clutch, member 28 when member 28 is pushed rearward in a manner to be described. The axial sliding movement which is necessary to effectuate magnetic coupling between members 26 and 28 is enabled by the keying of dial clutch member 28 onto the dial bushing 30 by a pin 42 which rides in a longitudinal slot in the bushing. The keying feature preserves the required preset angular relationship between the dial clutch member 28 and the dial 19, and rotation of the dial is attended by corresponding rotation of bushing 30, member 28, element 26, and pointer 18, whenever the latter magnetic clutching has been established.

Angular adjustment or setting of both the dial 19 and pointer 18 is accomplished by manipulation of knob 23. Knob shaft 43 attached to knob 23 is axially fixed but rotatable in relation to a surrounding sleeve member 44, the latter being slidably mounted in a supporting bracket 45 and angularly fixed therein by a key 46 which slides in a slot in bracket 45. Normally, shaft 43 is indexed in an outwardly-extended position by the setting of a spring biased ball 47 in one of two detents in sleeve 44, as is shown in dashed lines in Fig. 2. However, the mounting bracket 45 permits shaft 43 and sleeve 44 to slide axially therein as the knob 23 is pushed inward until the indexing ball 47 is seated in the second detent 48. Two distinct actions result as the knob is pushed inward. First, a bifurcated clutch arm 49 rigidly attached to sleeve 44 moves rearward, pressing one of its branches 50 against the clutch throw-out plate 40 and pressing the other of its branches 51 against the rear side of an accommodating channel in bushing 30. As is shown in Fig. 3, clutch arm 49 ultimately causes gyro clutch member 27 to be completely severed from magnetized clutching element 26 and further causes the dial clutch member 28 to engage the front surface of clutching element 26 in a firm holding engagement so that the dial and pointer will move together angularly. Second, the actuating gear 52 attached to knob shaft 43 is brought into meshing engagement with an intermediate gear 53 which is connected with a drive gear 54 held in permanent mesh with the dial gear 31. Therefore, manual rotation of knob 23 produces rotation of gears 52, 53, 54 and 31, and of dial 19, bushing 30, clutch element 26, and pointer 18. This simultaneous angular setting of the dial and pointer does not affect the gyroscope mechanism, because decoupling of clutch element 26 and clutch member 27 leaves the gyro output shaft free to rotate in accordance with azimuth movements of the supporting craft. The only minute friction which may be sensed by the gyroscope is that of the throw-out plate bearings 41, the throw-out plate 40 being angularly restrained by branch 50 of the clutch actuating arm 49. When simultaneous angular adjustment of the dial and pointer has been accomplished, knob 23 need only be pulled to its outer position, whereupon the clutch arm 49 is moved forward and gears 52 and 53 are unmeshed. The forward movement of clutch arm 49 causes its branch 51 to push dial clutch member 28 forward, out of engagement with magnetized clutch element 26, and the pointer 18 is once more freed from the dial. Branch 50 simultaneously frees the throw-out plate 40, whereupon springs 33 snap the gyro clutch member 27 into accurate engagement with the magnetized clutch element 26, no backlash occurring in this process, and the gyro is then coupled only with the pointer.

The other knob 24 is employed to declutch the gyro and angularly adjust the pointer alone. Like the knob 23, knob 24 is also provided with a shaft 55 which is rotatable in relation to but axially fixed with a sleeve 56. A frame bracket 57 supports the sleeve member 56 and is angularly keyed thereto by the projection 58 from the sleeve, while a spring-biased ball 59 is seated in either of two sleeve detents to hold the sleeve and knob shaft in either of two axial positions. Fig. 2 best illustrates this arrangement. At the rearmost end of knob shaft 55 there is attached a bevel-gear 60 which is rotatable therewith and which is permanently meshed with a second bevel gear 61 attached to a pointer drive shaft 62. Shaft 62 is preserved in a particular skewed relationship to the other axes of the instrument by a support bracket 63 affixed to the clutch arm 64, the latter being rigidly attached to the sleeve 56 and movable axially therewith. Further shaft 62 carries a drive wheel 65 at its uppermost end, the skewed angular setting of this shaft being selected such that rearward movement of the clutch arm 64 with knob 24 urges drive wheel 65 into frictional driving engagement with the frusto-conical surface of clutch element 26. Drive wheel 65 is preferably made of a material having only a slight resiliency to insure a firm driving engagement with element 26 and to avoid backlash effects which might be occasioned by more springy materials. The same rearward movement which couples drive wheel 65 and element 26 also causes clutch arm 64 to press against the clutch throw-out plate 40 and disengage the gyro clutch member 27 from magnetized clutch element 26, the latter action occurring first in sequence so that the gyro is entirely disconnected from the pointer before the pointer is coupled with knob 24. Bevel gears 60 and 61 remain meshed when knob 24 is pressed inward and manual rotation of knob 24 produces rotation of these gears, shaft 62, drive wheel 65, pointer clutch element 26, and pointer 18. When the pointer has been set in a proper azimuth orientation, the knob 24 need only be pulled out again, whereupon the drive wheel 65 first separates from pointer clutch element 26 and then the throw-out plate is sufficiently released to enable springs 33 to snap the gyro clutch member 27 into a firm holding engagement with the magnetized clutch element 26. Pointer 18 is thereafter driven by the gyro and the separation and reconnection between the two has occasioned no erroneous precession or backlash.

It should be apparent that the indicator features described in connection with the instrument of Figs. 1–3 are equally well suited for application in different instruments. Additionally, the various features may be modified or combined in other relationships. Thus, for example, the novel indicating mechanism may be employed with output apparatus of a radio direction indicator system, or the receiver of an electrical telemetering system, or other equipment which must have indicator adjustment apparatus with substantially torqueless and anti-backlash characteristics. In some embodiments, setting of only a pointer or only a dial corresponding to the pointer may be required. Components for synchronized settings, such as the knob 23, dial gear 31, clutch element 28, and clutch arm 49 may be eliminated from these embodiments. In other embodiments, particularly those wherein a dial replaces the pointer 18, an angularly movable indexing marker may be substituted for the dial 19, although the structure would otherwise be substantially as illustrated.

It is intended alternatively that the clutching assembly may be of the friction type rather than magnetic. Springs 33 are then made of greater strength than is required for a magnetic clutch and a spring is further provided between dial clutch member 28 and bushing 30 to urge member 28 into frictional engagement with clutch element 26. Although springs 33 are particularly suitable for preventing backlash effects in cooperation with cup member 35, other springs and angular restraining arrangements might be substituted.

While a particular embodiment of this invention has been shown and described herein, it will occur to those skilled in the art that various changes and modifications can be accomplished without departing either in spirit or scope from the invention as set forth in the appended claims.

What we claim as new and desire to secure by Letters Patent of the United States is:

1. An adjustable angular motion translating arrangement comprising first and second rotatable members disposed for angular coupling; means angularly orienting said first member to characterize intelligence; first output means angularly oriented by said second member; a third rotatable member disposed for angular coupling with said second member; second output means angularly oriented by said third member; first, second and third clutch members rotatable with said first, second and third rotatable members, respectively; adjusting means for angularly adjusting said third rotatable member and second output means; first clutch actuating means for engaging and disengaging said first and second clutch members; second clutch actuating means for engaging and disengaging said second and third clutch members; and means for operating said first and second clutch actuating means together to disengage said first and second clutch members when said second and third clutch members are engaged and to engage said first and second clutch members when said second and third clutch members are disengaged.

2. An adjustable angular motion translating arrangement comprising first and second rotatable members disposed for angular coupling therebetween; means angularly orienting said first member to characterize intelligence; first output means angularly oriented by said second member; a third rotatable member disposed for angular coupling with said second member; second output means angularly oriented by said third member; first, second and third clutch members, rotatable with said first, second and third rotatable members, respectively; first adjusting means arranged for connection with said second rotatable member and for angularly adjusting said second rotatable member and first output means; first clutch actuating means for engaging and disengaging said first and second clutch members; means for connecting and disconnecting said first adjusting means and second rotatable member and for operating said first clutch actuating means to disengage said first and second clutch members when said first adjusting means and second rotatable member are connected and to engage said first and second clutch members when said first adjusting means and second rotatable member are disconnected; second adjusting means for angularly adjusting said third rotatable member and second output means; second clutch actuating means for engaging and disengaging said second and third clutch members; and third clutch actuating means operated with said second clutch actuating means to disengage said first and second clutch members when said second and third clutch members are engaged by said second clutch actuating means.

3. An adjustable angular motion translating arrangement comprising first and second members rotatable about one axis; means angularly orienting said first member to characterize intelligence; first output means angularly oriented by said second member; a third rotatable member concentric with said second rotatable member; second output means angularly oriented by said third rotatable member; first, second and third clutch members angularly coupled with said first, second and third rotatable members, respectively; said second clutch member having a first clutch surface disposed for engagement with said first clutch member, and a second clutch surface disposed for engagement with said third clutch member; said first and third clutch members being axially movable into and out of engagement with said first and second clutch surfaces of said second clutch member; first angular adjusting means disposed for connection with and for angular adjustment of said second rotatable member; first clutch actuating means for moving said first clutch member axially into and out of engagement with said second clutch member; means operating said first angular adjusting means and first clutch actuating together to disengage said first and second clutch members when said first angular adjusting means is connected with said second rotatable member; second angular adjusting means for angularly adjusting said third rotatable member; second clutch actuating means for moving said third clutch member axially into and out of engagement with said second clutch member; third clutch actuating means for moving said first clutch member axially into and out of engagement with said second clutch member, and means operating said second and third clutch actuating means together to disengage said first and second clutch members when said second and third clutch members are engaged.

4. An adjustable angular motion translating arrangement comprising first, second and third members rotatable about one axis, means angularly orienting said first member to characterize intelligence, first output means angularly oriented by said second member; second output means angularly oriented by said third member, a first clutch member permanently magnetized and angularly coupled with said second rotatable member, second and third clutch members of magnetic material angularly coupled with and axially movable in relation to said first and third rotatable members, respectively, said second and third clutch members being disposed to move axially into and out of magnetic holding engagement with said first clutch member, resilient means urging said second clutch member into engagement with said first clutch member, first angular adjusting means disposed for connection with and for angular adjustment of said second rotatable member, first clutch actuating means for moving said second clutch member axially into and out of engagement with said first clutch member, means operating said first angular adjusting means and said first clutch actuating means together to disengage said first and second clutch members when said first angular adjusting means is connected with said second rotatable member, second angular adjusting means for angularly adjusting said third rotatable member, second clutch actuating means for moving said third clutch member axially into and out of engagement with said first clutch member, third clutch actuating means for moving said second clutch member axially into and out of engagement with said first clutch member, and means operating said second and third clutch actuating means together to disengage said first and second clutch members when said first and third clutch members are engaged.

5. An adjustable gyroscope arrangement comprising a gyroscope having a rotatable output shaft, a rotatable indicator shaft mounted for rotation collinearly with said gyro output shaft, an indicator rotatable with said indicator shaft, a first clutch member affixed to the end of one of said shafts, a second clutch member mounted on the end of the other of said shafts for axial movement into and out of engagement with said first clutch member, at least one transverse spring member attached to one of said second clutch member and said other of said shafts, said transverse spring member extending radially outward from the axis of said shafts and having rigidity angularly and flexibility in directions parallel with said axis, a transversely-slotted member attached to the other of said second clutch member and said other of said shafts, said transverse spring member being angularly restrained in a slot in said slotted member and axially urging said second clutch member into engagement with said first clutch member, adjusting means disposed for coupling with said indicator and for angularly adjusting said indicator when coupled therewith, clutch-actuating means for moving said second member axially out of engagement with said first member against the restraining force of said spring member, and manually-actuatable means operating both said adjusting means and said clutch-actuating means to disengage said clutch members when said adjusting means is coupled with said indicator.

6. An adjustable gyroscope arrangement comprising a gyroscope having a rotatable output shaft, a rotatable indicator shaft mounted for rotation collinearly with said gyro output shaft, an indicator rotatable with said indicator shaft, a first clutch member affixed to one of said shafts, a second clutch member mounted on the other of said shafts for axial movement into and out of engagement with said first clutch member, one of said clutch members being permanently magnetized and the other being magnetic, an anti-backlash coupling member affixed to one of said second clutch member and said other of said shafts and extending transversely in relation to the axis of said shafts, said coupling member having angular rigidity about said axis and being flexible in directions parallel with said axis, a transversely-slotted coupling member attached to the other of said second clutch member and said other of said shafts, said anti-backlash member being positioned in a slot in said slotted member and axially biasing said second clutch member into engagement with said first clutch member, a clutch throw-out member axially fixed and angularly rotatable in relation to said second clutch member, adjusting means disposed for coupling with said indicator and for angularly adjusting said indicator when coupled therewith, clutch-actuating means for moving said throw-out member to disengage said clutch members, and manually-actuatable means operating both said adjusting means and said clutch-actuating means to disengage said clutch members when said adjusting means is coupled with said indicator.

7. An adjustable gyroscope arrangement comprising a gyroscope having a rotatable output shaft, a rotatable indicator shaft mounted for rotation collinearly with said gyro output shaft, a first indicator rotatable with said indicator shaft, a second indicator angularly adjustable about the axis of said shafts, a first clutch member affixed to one of said shafts, a second clutch member mounted on the other of said shafts for axial movement into and out of engagement with said first clutch member, an anti-backlash coupling member affixed to one of said second clutch member and said other of said shafts and extending transversely in relation to the axis of said shafts, said coupling member having angular rigidity about said axis and being flexible in directions parallel with said axis, a transversely-slotted coupling member attached to the other of said second clutch member and said other of said shafts, said anti-backlash member being positioned in a slot in said slotted member and axially biasing said second clutch member into engagement with said first clutch member, adjusting means disposed for coupling with said first indicator and for angularly adjusting said indicator when coupled therewith, clutch-actuating means for moving said second clutch member axially out of engagement with said first clutch member, manually-actuatable means operating both said adjusting means and said clutch-actuating means to disengage said clutch members when said adjusting means is coupled with said indicator, a third clutch member angularly coupled with said second indicator and axially movable into and out of engagement with the clutch member coupled with said indicator shaft, and manually-actuatable means for angularly adjusting said second indicator and for engaging and disengaging said third clutch member.

8. An adjustable directional gyroscope arrangement comprising a directional gyroscope angularly orienting an output shaft to characterize azimuth headings, a rotatable indicator shaft collinear with said output shaft, a first indicator rotatable with said indicator shaft, a second indicator angularly adjustable about the axis of said shaft, a first clutch member angularly coupled with said gyro output shaft, a second clutch member angularly coupled with said indicator shaft, a third clutch member angularly coupled with said second indicator, said first and third clutch members being movable into and out of engagement with said second clutch member, means resiliently biasing said first clutch member into engagement with said second clutch member, first manually-actuatable adjusting means disposed for coupling with and decoupling from said first indicator and for angularly adjusting said first indicator when coupled therewith, clutch throw-out means actuated by said first adjusting means to disengage said first clutch member from said second clutch member when said first adjusting means is coupled with said first indicator, second manually-actuatable adjusting means for angularly adjusting said second indicator, and means for engaging and disengaging said second and third clutch members and for disengaging said first and second clutch members when said second and third clutch members are engaged.

9. An adjustable directional gyroscope arrangement comprising a directional gyroscope angularly orienting an output shaft to characterize azimuth headings, a rotatable azimuth pointer shaft collinear with said gyro output shaft, an azimuth pointer rotatable with said pointer shaft, an azimuth dial angularly adjustable about the axis of said shafts, a first magnetic clutch member angularly coupled with said gyro output shaft, a second magnetized clutch member angularly coupled with said pointer shaft, a third magnetic clutch member angularly coupled with said dial, said first and third magnetic clutch members being movable into and out of engagement with said second magnetized clutch member, first manually-actuatable adjusting means disposed for coupling with and decoupling from said pointer shaft and for angularly adjusting said pointer shaft when coupled therewith, clutch throw-out means for disengaging said first and second clutch members when said first adjusting means is coupled with said pointer shaft, second manually-actuatable adjusting means for angularly adjusting said dial, and means for engaging and disengaging said second and third clutch members and for disengaging said first and second clutch members when said second and third clutch members are engaged.

10. An adjustable directional gyroscope arrangement comprising a support, a universally-gimballed directional gyroscope mounted on said support, a rotatable input shaft mounted on said support and angularly oriented by said gyroscope, an azimuth pointer shaft rotatably mounted in said support collinearly with said gyro output shaft, an azimuth pointer coupled with said pointer shaft, an azimuth dial mounted on said support for angular adjustment about the axis of said pointer shaft, a first clutch member angularly coupled with said gyro output shaft, a second clutch member angularly coupled with said pointer shaft, a third clutch member angularly coupled with said dial, said first and third clutch members being movable into and out of engagement with said second clutch member, a rotatable drive wheel mounted on said support for movement between one position in which said wheel is in frictional driving engagement with said second clutch member and another position in which said wheel is disengaged from said second clutch member, first clutch actuating means movable to engage and disengage said first and second clutch members, first knob means for angularly rotating said drive wheel and for moving said drive wheel and clutch actuating means such that said first and second clutch members are disengaged when said drive wheel is in said one position and engaged when said drive wheel is in said other position, second clutch actuating means movable to engage and disengage said first and second clutch members, third clutch actuating means movable to engage and disengage said second and third clutch members, gear means for angularly adjusting said dial, and second knob means for rotating said gear means and for moving said second and third clutch actuating means such that said first and second clutch members are disengaged and engaged, respectively, when said second and third clutch members are engaged and disengaged.

11. An adjustable directional gyroscope arrangement comprising a support, a universally-gimballed directional gyroscope mounted on said support, a rotatable output shaft mounted on said support and angularly oriented by said gyroscope, an azimuth pointer shaft rotatably mounted in said support collinearly with said gyro output shaft, an azimuth dial mounted on said support for angular adjustment about the axis of said pointer shaft, a first magnetic clutch plate angularly coupled with said gyro output shaft, a second magnetized clutch plate angularly coupled with said pointer shaft and having two oppositely-disposed clutching surfaces, a third magnetic clutch plate angularly coupled with said dial, each of said first and third clutch plates being mounted on said support for axial movement into and out of engagement with a different one of said clutching surfaces of said second clutch plate, a rotatable drive wheel mounted on said support for movement between one position in which said wheel is in frictional engagement with said second clutch plate and another position in which said wheel is disengaged from said second clutch plate, first clutch actuating means movable to engage and disengage said first and second clutch plates, first knob means for angularly rotating said drive wheel and for moving said drive wheel and clutch actuating means such that said first and second clutch plates are disengaged when said drive wheel is in said one position and engaged when said drive wheel is in said other position, second clutch actuating means movable to engage and disengage said first and second clutch plates, third clutch actuating means movable to engage and disengage said second and third clutch plates, gear means for angularly adjusting said dial, and second knob means for rotating said gear means and for moving said second and third clutch actuating means such that said first and second clutch plates are disengaged and engaged, respectively, when said second and third clutch plates are engaged and disengaged.

12. An adjustable directional gyroscope arrangement comprising a support, a universally-gimballed directional gyroscope mounted on said support and angularly oriented by said gyroscope, an azimuth pointer shaft rotatably mounted in said support collinearly with said gyro output shaft, an azimuth dial mounted on said support for angular adjustment about the axis of said pointer shaft, a first magnetic clutch plate mounted on said gyro output shaft for axial movement in relation thereto, an anti-backlash elongated spring member affixed to said first clutch plate and extending transversely in relation to the axis of said shafts, said spring member having rigidity angularly about said axis and flexibility in directions parallel with said axis, a transversely-slotted coupling member attached to said gyro output shaft, said elongated spring member extending through at least one slot in said coupling member, a second magnetized clutch plate angularly coupled with said pointer shaft and having two oppositely disposed clutching surfaces, a third magnetic clutch plate angularly coupled with said dial, each of said first and third clutch plates being axially movable into and out of engagement with a different one of said clutching surfaces of said second clutch plate, a rotatable drive wheel mounted on said support for movement between one position in which said wheel is in frictional engagement with said second clutch plate and another position in which said wheel is disengaged from said second clutch plate, a clutch throwout plate revolubly supported about said axis on low friction bearings and axially fixed in relation to said second clutch plate, first clutch actuating means for moving said throw-out plate axially to disengage said first clutch plate from said second clutch plate, first knob means for angularly rotating said drive wheel and for moving said drive wheel and clutch actuating means such that said first and second clutch plates are disengaged when said drive wheel is in said one position and engaged when said drive wheel is in said other position, second clutch actuating means for moving said throw-out plate axially to disengage said first clutch plate from said second clutch plate, third clutch actuating means movable to engage and disengage said second and third clutch plates, gear means for angularly adjusting said dial, and second knob means for rotating said gear means and for moving said second and third clutch actuating means such that said first and second clutch plates are disengaged and engaged, respectively, when said second and third clutch plates are engaged and disengaged.

References Cited in the file of this patent

UNITED STATES PATENTS

| | | |
|---|---|---|
| 1,295,003 | Chandler | Feb. 18, 1919 |
| 2,363,495 | Bates | Nov. 28, 1944 |
| 2,379,869 | Baker | July 10, 1945 |
| 2,416,646 | Rylsky | Feb. 25, 1947 |